United States Patent
Gopalakrishnan et al.

(10) Patent No.: US 10,677,212 B2
(45) Date of Patent: Jun. 9, 2020

(54) METHOD AND APPARATUS FOR CONTROLLED STOPPING OF INTERNAL COMBUSTION ENGINE

(71) Applicant: GM Global Technology Operations LLC, Detroit, MI (US)

(72) Inventors: Suresh Gopalakrishnan, Troy, MI (US); Lei Hao, Troy, MI (US); Chandra S. Namuduri, Troy, MI (US); Paul S. Lombardo, Ferndale, MI (US); Chunhao J. Lee, Troy, MI (US); Alexandru Rajala, Farmington Hills, MI (US); Neeraj S. Shidore, Novi, MI (US); Farzad Samie, Franklin, MI (US); Norman K. Bucknor, Troy, MI (US); Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 15/967,961

(22) Filed: May 1, 2018

(65) Prior Publication Data
US 2019/0338742 A1 Nov. 7, 2019

(51) Int. Cl.
*F02N 11/08* (2006.01)
(52) U.S. Cl.
CPC ...... *F02N 11/0818* (2013.01); *F02N 11/0851* (2013.01); *F02N 2200/022* (2013.01); *F02N 2200/047* (2013.01)
(58) Field of Classification Search
CPC ............. F02N 11/0814; F02N 11/0851; F02N 11/0855; F02N 19/005; F02N 2019/008;
(Continued)

(56) References Cited

U.S. PATENT DOCUMENTS 3,741,021 A * 6/1973 Parsons .................. F02N 15/06
74/7 R
5,713,320 A * 2/1998 Pfaff ..................... F02N 11/006
123/179.3
(Continued)

FOREIGN PATENT DOCUMENTS

CN 2711983 Y 7/2005
CN 101487434 A 7/2009
(Continued)

OTHER PUBLICATIONS

Quanbao Zhou, John Houldcroft, "Cold engine cranking torque requirement analysis," SAE International Inc., 2007, JSAE 20077002.
(Continued)

*Primary Examiner* — John M Zaleskas
(74) *Attorney, Agent, or Firm* — Quinn IP Law

(57) ABSTRACT

A method of controlled stopping an internal combustion engine having a stop-start mode and starter assembly includes detecting when the stop-start mode is active. The method also includes monitoring current rotational speed and position of the engine. The method additionally includes determining when the current rotational position is within a predetermined range of a target stop rotational position and the current rotational speed is less than a threshold rotational speed, and afterward energizing the starter assembly to engage the engine. The method also includes establishing a time delay following energizing the starter assembly to confirm engagement of the starter assembly with the engine. Furthermore, the method includes applying a torque by the starter assembly to stop the engine at the target stop position. A vehicle powertrain employing the engine equipped with the stop-start mode, the starter assembly, and an electronic controller configured to execute the method is also provided.

20 Claims, 5 Drawing Sheets

(58) Field of Classification Search
CPC ......... F02N 2200/021; F02N 2200/022; F02N 2200/047
USPC .................................................... 123/179.4
See application file for complete search history.

(56) References Cited

U.S. PATENT DOCUMENTS

| | | | | |
|---|---|---|---|---|
| 5,760,485 | A * | 6/1998 | Shiga | F02N 15/046 290/38 R |
| 6,763,735 | B2 * | 7/2004 | Siems | F02N 15/062 123/179.25 |
| 9,121,380 | B2 | 9/2015 | Fulton | |
| 9,827,974 | B1 * | 11/2017 | Boyko | B60W 20/12 |
| 2003/0163244 | A1 * | 8/2003 | Ando | B60K 6/24 701/112 |
| 2005/0229889 | A1 * | 10/2005 | Hoevermann | F02D 41/009 123/179.4 |
| 2005/0236837 | A1 * | 10/2005 | Kusumi | F02N 11/04 290/36 R |
| 2006/0181084 | A1 * | 8/2006 | Albertson | F02N 11/0855 290/38 R |
| 2007/0233357 | A1 * | 10/2007 | Sugai | B60K 6/48 701/105 |
| 2008/0127935 | A1 * | 6/2008 | Park | B60K 6/48 123/332 |
| 2008/0162007 | A1 * | 7/2008 | Ishii | F02N 11/0855 701/54 |
| 2009/0020091 | A1 * | 1/2009 | Botzenhard | F02N 11/0855 123/179.3 |
| 2009/0224557 | A1 * | 9/2009 | Reynolds | F02N 11/0814 290/38 R |
| 2010/0083926 | A1 * | 4/2010 | Okumoto | F02N 11/0855 123/179.4 |
| 2010/0101522 | A1 * | 4/2010 | Ge | F02N 11/0855 123/179.3 |
| 2010/0180844 | A1 * | 7/2010 | Uehama | F01L 1/022 123/90.17 |
| 2010/0180849 | A1 * | 7/2010 | Senda | F02N 11/0855 123/179.4 |
| 2010/0282199 | A1 * | 11/2010 | Heyers | F02N 11/0855 123/179.3 |
| 2011/0132308 | A1 * | 6/2011 | Liu | F02N 11/0855 123/179.4 |
| 2011/0184626 | A1 * | 7/2011 | Mauritz | F02N 11/0855 701/102 |
| 2011/0246050 | A1 * | 10/2011 | Roessle | F02N 11/0855 701/113 |
| 2011/0290212 | A1 * | 12/2011 | Abboud | F02N 11/0814 123/333 |
| 2013/0054185 | A1 * | 2/2013 | Cwik | F02N 11/0844 11/844 |
| 2013/0080037 | A1 * | 3/2013 | Fujiwara | F02N 11/0822 11/822 |
| 2013/0166177 | A1 * | 6/2013 | Calva | F02D 41/0002 701/103 |
| 2013/0283938 | A1 * | 10/2013 | Palfai | F02N 11/0844 74/6 |
| 2014/0330476 | A1 * | 11/2014 | Tsukada | B60K 6/445 701/22 |
| 2015/0019109 | A1 * | 1/2015 | Trofimov | F02D 41/042 701/102 |
| 2015/0285202 | A1 * | 10/2015 | Spohn | F02D 17/04 123/332 |
| 2016/0017856 | A1 * | 1/2016 | Tsukada | B60L 50/62 701/112 |
| 2016/0096523 | A1 * | 4/2016 | Ang | B60W 20/40 701/22 |
| 2016/0114789 | A1 * | 4/2016 | Kawai | B60K 6/24 701/22 |
| 2016/0318519 | A1 * | 11/2016 | Hirai | F02N 19/005 |
| 2017/0282890 | A1 * | 10/2017 | Fujimoto | B60K 6/445 |
| 2017/0334297 | A1 * | 11/2017 | Hao | H02K 1/276 |
| 2017/0334422 | A1 | 11/2017 | Namuduri et al. | |
| 2017/0338706 | A1 * | 11/2017 | Hao | F02N 11/00 |
| 2018/0030944 | A1 | 2/2018 | Raad | |
| 2018/0258900 | A1 * | 9/2018 | Namuduri | F02N 11/0848 |
| 2019/0323470 | A1 * | 10/2019 | Namuduri | F02N 11/0862 |
| 2019/0338743 | A1 * | 11/2019 | Gopalakrishnan | F02N 11/0851 |

FOREIGN PATENT DOCUMENTS

| | | | | |
|---|---|---|---|---|
| EP | 0619427 | B1 | 10/1994 | |
| JP | 2000104650 | A | 4/2000 | |
| JP | 2003148317 | A | 5/2003 | |
| JP | 2014040794 | A * | 3/2014 | F02D 29/02 |
| JP | 2016200007 | A * | 12/2016 | F02N 11/0814 |
| JP | 2017061883 | A * | 3/2017 | |
| WO | WO-2012000776 | A1 * | 1/2012 | F02N 11/0814 |
| WO | WO-2012063732 | A1 * | 5/2012 | F02D 29/02 |

OTHER PUBLICATIONS

Hao et al., Utility U.S. Appl. No. 15/961,176, filed Apr. 24, 2018.
Hao et al., Utility U.S. Appl. No. 15/961,216, filed Apr. 24, 2018.
Hao et al., Utility U.S. Appl. No. 15/417,734, filed Jan. 27, 2017.
Hao et al., Utility U.S. Appl. No. 15/158,887, filed May 19, 2016.
Namuduri et al., Utility U.S. Appl. No. 15/452,312, filed Mar. 7, 2017.

\* cited by examiner

METHOD AND APPARATUS FOR CONTROLLED STOPPING OF INTERNAL COMBUSTION ENGINE

INTRODUCTION

The present disclosure relates to a method and an apparatus for controlled stopping of an internal combustion engine, such as employed in a vehicle powertrain.

A typical internal combustion engine frequently uses an electric starter to turn the engine's crankshaft leading up to a start event to initiate a combustion start of the engine. A typical starter includes a pinion gear that is driven by an electric motor, and that is pushed out for engagement with a ring gear that is attached to the engine's crankshaft flywheel or flex-plate, in order to start the engine.

In some vehicle applications, a stop-start system is employed, where the engine is automatically stopped or shut off to conserve fuel when vehicle propulsion is not required, and is then automatically re-started by such a starter when drive torque is again requested. Such a stop-start system may be employed in a vehicle having a single powerplant, or in a hybrid vehicle application that includes both an internal combustion engine and a motor/generator for powering the vehicle. Occasionally, such automatic engine restarts may generate noise vibration and harshness (NVH) concerns in the host vehicle.

SUMMARY

A method of controlled stopping an internal combustion engine equipped with a stop-start mode and starter assembly includes detecting, via an electronic controller, when the engine stop-start mode is active. The method also includes monitoring, via the controller, a current rotational speed and a current rotational position of the engine. The method additionally includes determining, via the controller, whether the current rotational position of the engine is within a predetermined range of a target stop rotational position, and determining whether the current rotational speed of the engine is less than a threshold rotational speed. The method also includes energizing the starter assembly to engage the engine when the current rotational position is within the predetermined range of the target stop rotational position and the current rotational speed is less than the threshold rotational speed. The method also includes establishing, via the controller, a time delay following energizing the starter assembly to confirm engagement of the starter assembly with the engine. The method additionally includes applying a torque by the starter assembly to stop the engine at the target stop position.

The method may also include assessing or determining, via the controller, whether the target stop position of the engine is reached. In such an embodiment, the method may further include disengaging the starter assembly from the engine when the target stop position is reached to thereby complete the controlled stopping of the engine.

The method may additionally include detecting, via a sensor, the target position of the engine having been reached, and communicating, to the controller via the sensor, a signal indicative of the detected target position of the engine having been reached.

The starter assembly may include a brushless electric motor, a solenoid, and a pinion gear. The brushless electric motor may be configured to spin the pinion gear and the solenoid may be configured to shift the pinion gear. In such an embodiment, the method may further include detecting a fuel being supplied to the engine and spinning the pinion gear up to and at a predetermined speed prior to energizing the starter assembly to engage the engine.

The starter assembly may be characterized by the absence of a one-way clutch arranged between the solenoid and the pinion gear. In such an embodiment, the pinion gear may be operatively coupled to the brushless electric motor when the solenoid is activated, i.e., engaged or energized.

The engine may include a crankshaft connected to a ring gear. In such an embodiment, energizing the starter assembly to engage the engine may include energizing the solenoid to shift the pinion gear for engagement with the ring gear.

The starter assembly may additionally include a housing and a spring arranged between the pinion gear and the housing. In such an embodiment, the spring may be configured to release the pinion gear from the ring gear when the solenoid is de-energized.

The time delay may be 50 milliseconds to confirm engagement of the pinion with the crankshaft of the engine.

Each of the current rotational position and the current rotational speed of the engine may be that of the engine crankshaft.

The target stop position of the engine may be a stop position of the crankshaft with respect to top dead center (TDC) In such an embodiment, the target stop position of the crankshaft may be in a range of +/−30 degrees with respect to TDC.

Applying the torque by the starter assembly to stop the engine at the target stop position may include determining, via the controller, a difference between the current rotational position of the engine and the target stop position of the engine. In such an embodiment, the torque to stop the engine at the target stop position by the starter assembly may be determined according to a mathematical relationship using the determined difference between the current rotational position and the target stop position of the engine.

A vehicle powertrain employing an internal combustion engine equipped with a stop-start mode and including the starter assembly and an electronic controller configured to execute the method of controlled stopping of the engine is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
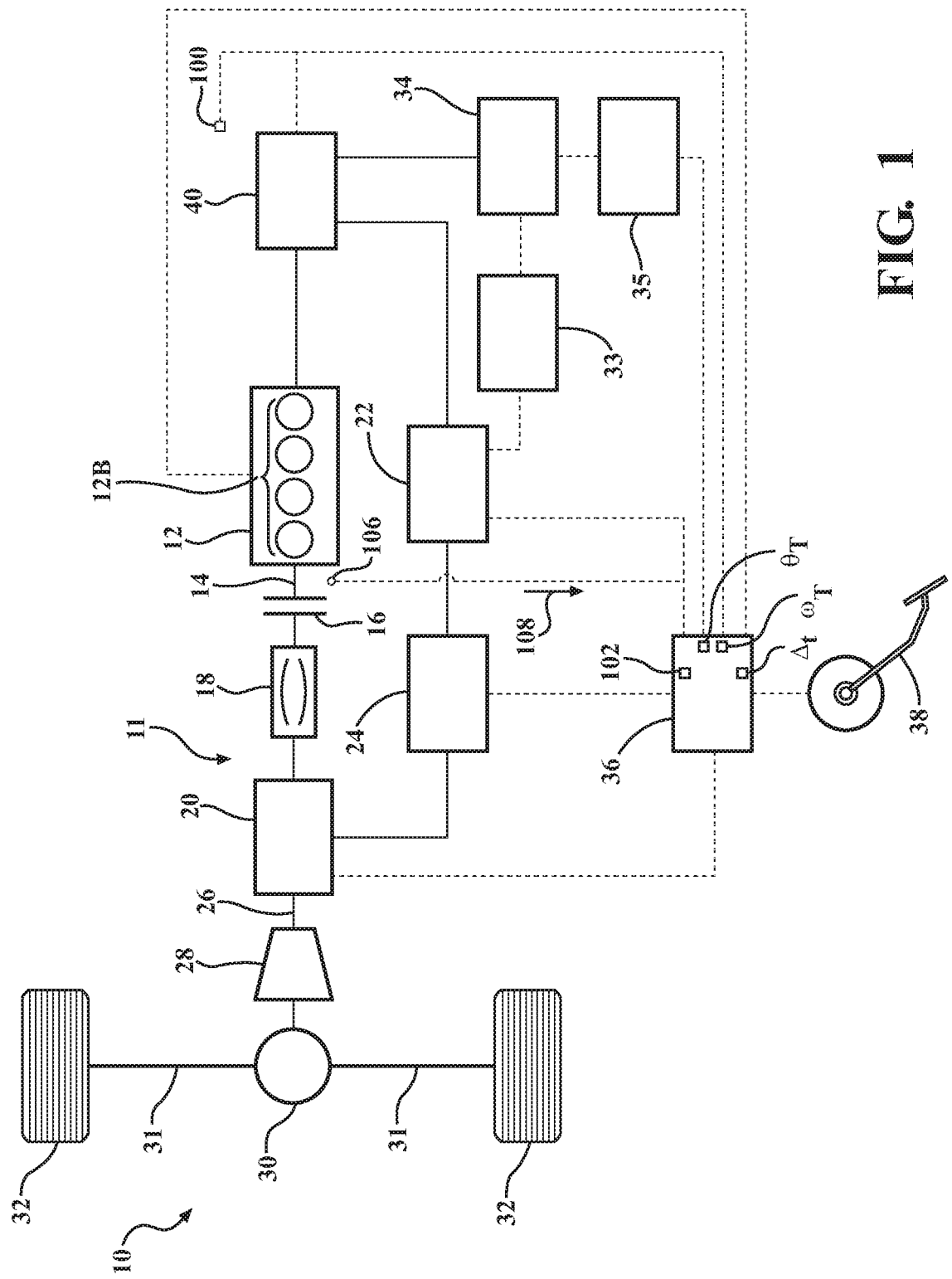
FIG. 1 is a system schematic of a vehicle including a propulsion system with an internal combustion engine and a brushless electric starter therefor.

Referring to the drawings, wherein like reference numbers refer to like components, FIG. 1 shows a system schematic of a vehicle 10 having a powertrain 11. The vehicle 10 may have a propulsion system employing solely an internal combustion engine 12 equipped with a stop-start mode. Alternatively, the vehicle 10 may be a hybrid electric vehicle (HEV) wherein the powertrain 11 employs both the internal combustion engine 12 and an electric propulsion source. In the case of the HEV embodiment of the vehicle 10, either or both of the engine 12 and the electric propulsion source may be selectively activated to provide propulsion based on the vehicle operating conditions.

The internal combustion engine 12 outputs torque to a shaft 14, such the engine's crankshaft. One or more decoupling mechanisms may be included along the shaft 14 to decouple output of the engine 12 from the remaining portions of the vehicle driveline. A clutch 16 is provided to allow selection of a partial or complete torque decoupling of the engine 12. The clutch 16 may be a friction clutch having a plurality of friction plates at least partially engaged when the clutch is closed to transfer torque, and disengaged when the clutch is opened to isolate torque flow between the downstream portions of the driveline and the engine 12. A torque converter 18 may also be included to provide a fluid coupling between the output portion of engine 12 and downstream portions of the vehicle driveline. The torque converter 18 operates to smoothly ramp up torque transfer from the engine 12 to the rest of the driveline. Also, the torque converter 18 allows a decoupling of the engine 12, such that the engine may continue to operate at low rotational speed without generating propulsion of the vehicle 10, e.g., at stationary idle conditions.

In the case of the HEV embodiment of the vehicle 10, the electric propulsion source may be a first electric machine 20 powered by a high-voltage external power source and energy storage system 22 including a high-voltage traction battery. Generally, a high-voltage traction battery is one that has an operating voltage greater than about 36 volts but less than 60 volts. For example, the traction battery may be a lithium ion high-voltage battery with a nominal voltage of 48 volts. In the HEV embodiment of the vehicle 10, high-voltage direct current is conditioned by an inverter 24 before delivery to the first electric machine 20. The inverter 24 includes a number of solid state switches and a control circuit operating to convert the direct current into three-phase alternating current to drive the first electric machine 20.

Additionally, in the case of the HEV powertrain, the first electric machine 20 may have multiple operating modes depending on the direction of power flow. In a motor mode, power delivered from the high-voltage traction battery allows the first electric machine 20 to generate output torque to a shaft 26. The output torque of the first electric machine 20 may then be transferred through a variable ratio transmission 28 to facilitate selection of a desired gear ratio prior to delivery of output torque to a final drive mechanism 30. The final drive mechanism 30 may be a multi-gear differential configured to distribute torque to one or more side- or half-shafts 31 coupled to wheels 32. The first electric machine 20 may be disposed either upstream of the transmission 28, downstream of the transmission 28, or integrated within a housing of the transmission 28.

The first electric machine 20 may also be configured to operate in a generation mode to convert rotational motion of various driveline components into electrical power for storage in the traction battery 22. When the vehicle 10 is moving, whether propelled by the engine 12 or coasting from its own inertia, rotation of the shaft 26 turns an armature, or rotor, (not shown) of the first electric machine 20. Such rotational motion causes an electromagnetic field to generate alternating current that is passed through the inverter 24 for conversion into direct current. The direct current may then be provided to the high-voltage traction battery to replenish the charge stored at the battery. A unidirectional or bidirectional DC-DC converter 33 may be used to charge a low-voltage (e.g., 12 volt) battery 34 and supply the low voltage loads 35, such as 12 volt loads. When a bidirectional DC-DC converter 33 is used, it is possible to jump start the high-voltage traction battery 22 from the low-voltage battery 34.

The various propulsion system components discussed herein may have one or more associated controllers to control and monitor operation. The powertrain 11 also includes an electronic controller 36. Although the controller 36 is schematically depicted as a single controller, the subject controller may also be implemented as a system of cooperative controllers to collectively manage the propulsion system. Multiple controllers may be in communication via a serial bus (e.g., Controller Area Network (CAN)) or via discrete conductors. The controller 36 includes one or more digital computers, each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various herein discussed propulsion system components. The controller 36 is in communication with the engine 12 and receives signals indicative of at least engine speed, temperature, as well as other engine operating conditions. The controller 36 may also be in communication with the first electric machine 20 and receive signals indicative of motor speed, torque, and the first electric machine's current draw. The controller 36 may also be in communication with the high-voltage traction battery 22 and receive signals indicative of such status indicators as a battery state of charge (SOC), temperature, and current supplied or absorbed by the battery. The controller 36 may also receive signals indicative of the circuit voltage across the high-voltage bus. The controller 36 may further be in communication with one or more sensors arranged at driver input pedal(s) 38 to receive signals indicative of specific pedal position, which may reflect acceleration demand by the driver. The driver input pedal(s) 38 may include an accelerator pedal and/or a brake pedal. In alternative embodiments such as a self-driving autonomous vehicle, acceleration demand may be determined sans driver interaction by a computer either on-board the vehicle 10 or external to the vehicle.

As mentioned above, in the case of the HEV embodiment of the vehicle 10, either one or both of the engine 12 and the first electric machine 20 may be operated at a particular time based at least on the propulsion requirements of the subject vehicle. During high torque demand conditions, the controller 36 may cause both, the engine 12 and the first electric machine 20 to be activated, such that each of the propulsion sources provides respective output torque for simultaneous or combined propulsion of the vehicle 10. In certain moderate torque demand conditions, generally the engine 12 operates efficiently and may be used as the sole propulsion source. For example, during highway driving of the HEV at a generally constant speed, the first electric machine 20 may be deactivated, such that only the engine 12 provides output torque.

Under other operating conditions of the HEV, the engine 12 may be deactivated or stopped, such that only the first electric machine 20 provides output torque. The clutch 16 may be opened to decouple the shaft 14 from the downstream portions of the powertrain. Specifically, during coast conditions where the HEV's driver allows the vehicle 10 to decelerate under driveline and road friction, as well as air resistance, the engine 12 may be deactivated and the first electric machine 20 operated in generator mode to recover energy. Additionally, even in a vehicle 10 using only the engine 12 for propulsion, deactivation of the engine 12 may be desirable during a temporary vehicle stop, such as at a traffic light. Instead of allowing the engine 12 to idle, fuel consumption may be reduced by deactivating the engine while the vehicle 10 is stationary. In both examples, it may be beneficial to rapidly restart the engine 12 in response to a subsequent resumption or increase of propulsion demand. A prompt startup of the engine 12 may avoid roughness and/or latency in power delivery being perceived by a driver of the vehicle 10. However, occasionally, such an engine 12 restart may generate an noise, vibration, and harshness (NVH) concern in the vehicle 10, primarily if the engine is being restarted from a position of the crankshaft 14 when the engine's first to fire cylinder 12B (shown in FIG. 1), which may be any one of the engine's cylinders, upon a restart needs to rotate through a relatively large arc prior to actual firing.

The vehicle 10 also includes a second electric machine 40. The second electric machine 40 is coupled to the engine 12. The second electric machine 40 operates as an engine starter, and the entire assembly thereof is herein designated via the numeral 40. When the starter assembly 40 is engaged with the engine 12 leading up to a combustion cycle, the starter turns a crankshaft of the engine to facilitate a cold start or a restart thereof. Specifically, the starter assembly 40 is configured to engage with and selectively apply an input torque to a, typically external, ring gear 12A (shown in FIG. 2) that is attached to the crankshaft flywheel or flex-plate (not shown) of the engine 12, in order to start the engine. According to aspects of the present disclosure, the controller 36 is programmed to issue a command to start the engine 12 using the starter assembly 40 in response to an acceleration demand, such as detected via sensor(s) (not shown) at driver input pedal(s) 38, following a period of reduced acceleration demand.

Figure 2:
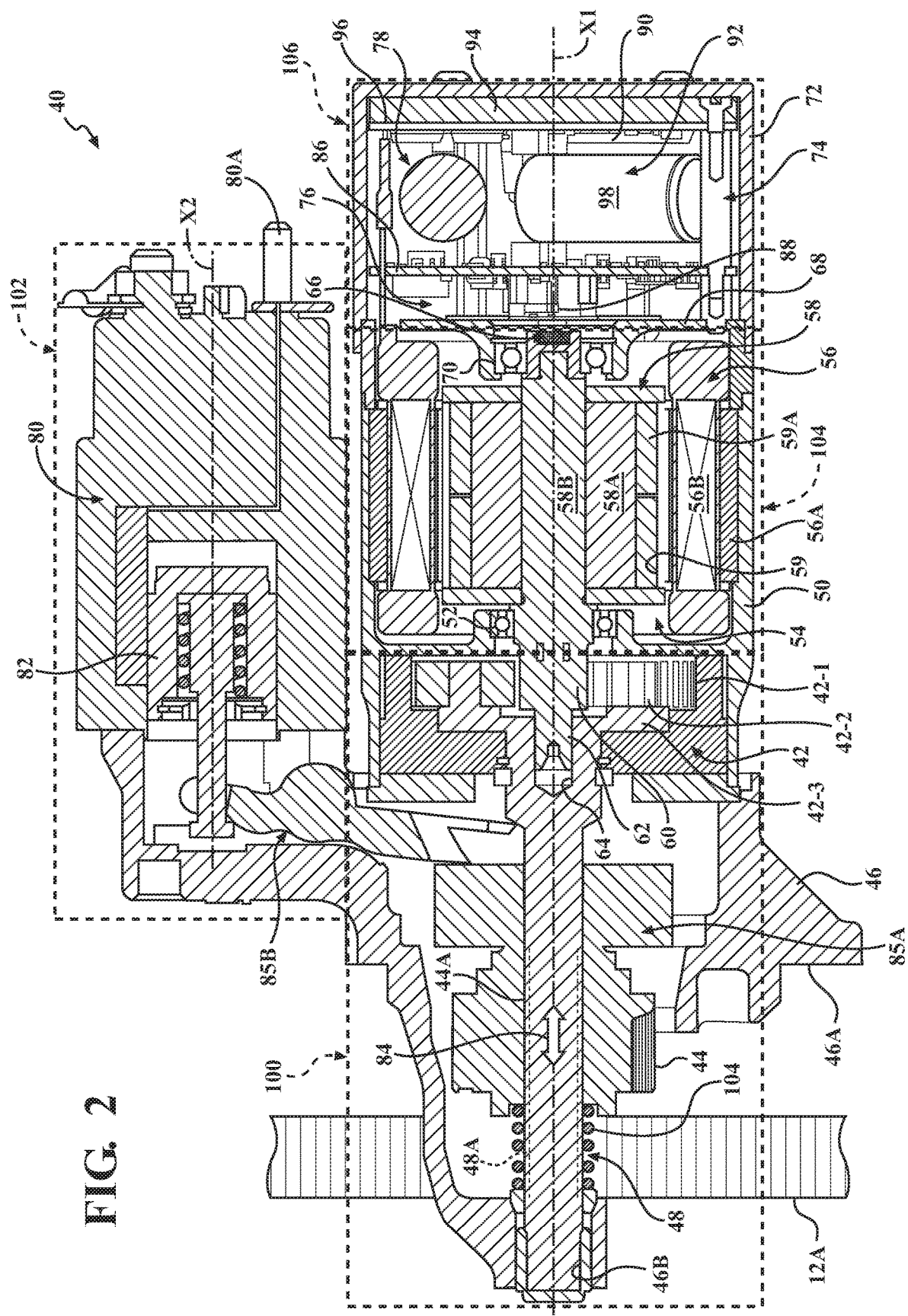
FIG. 2 is a cross-sectional view of the electric starter shown in FIG. 1.
Figure 3:
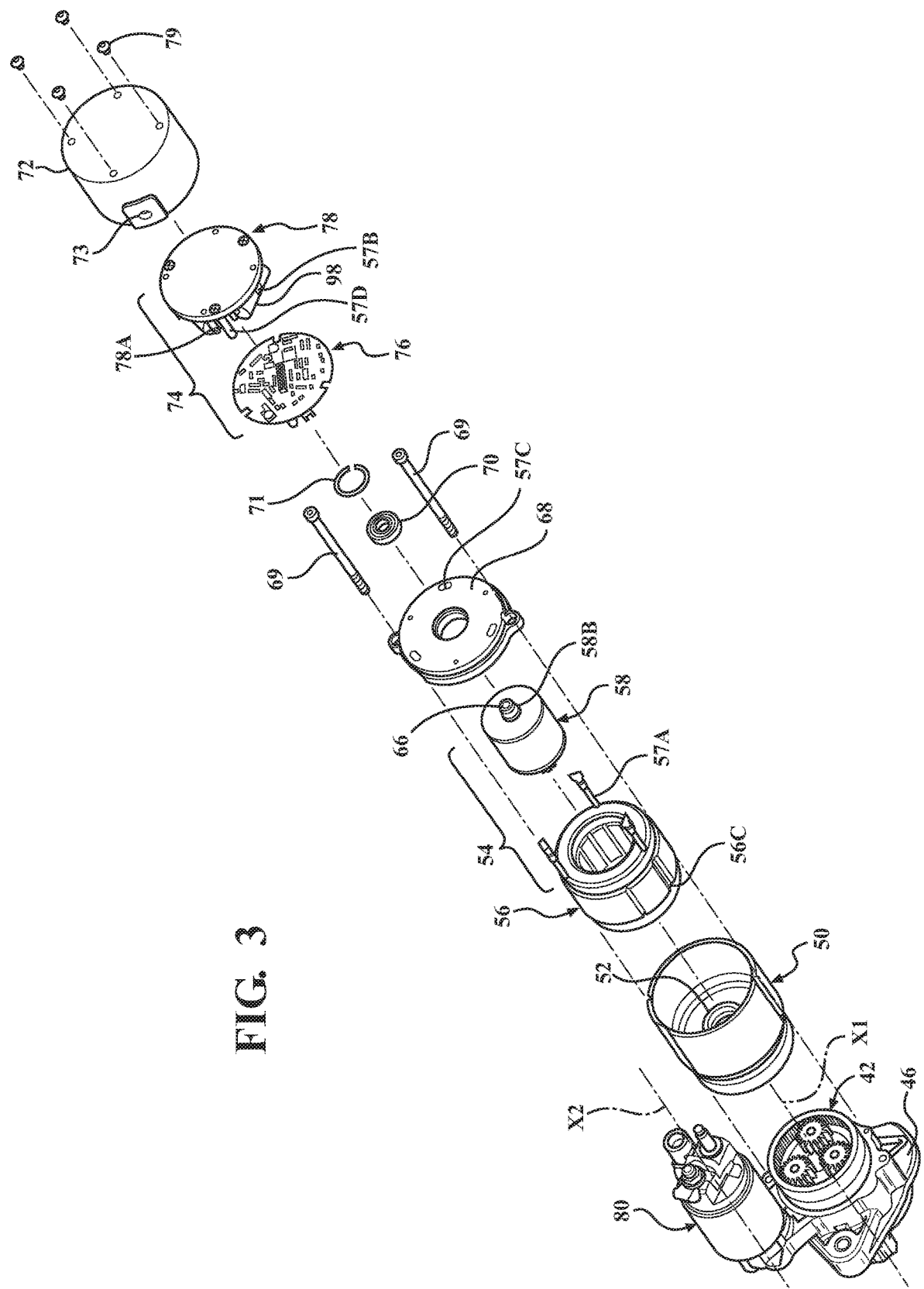
FIG. 3 is an exploded perspective back view of the electric starter shown in FIG. 2.
Figure 4:
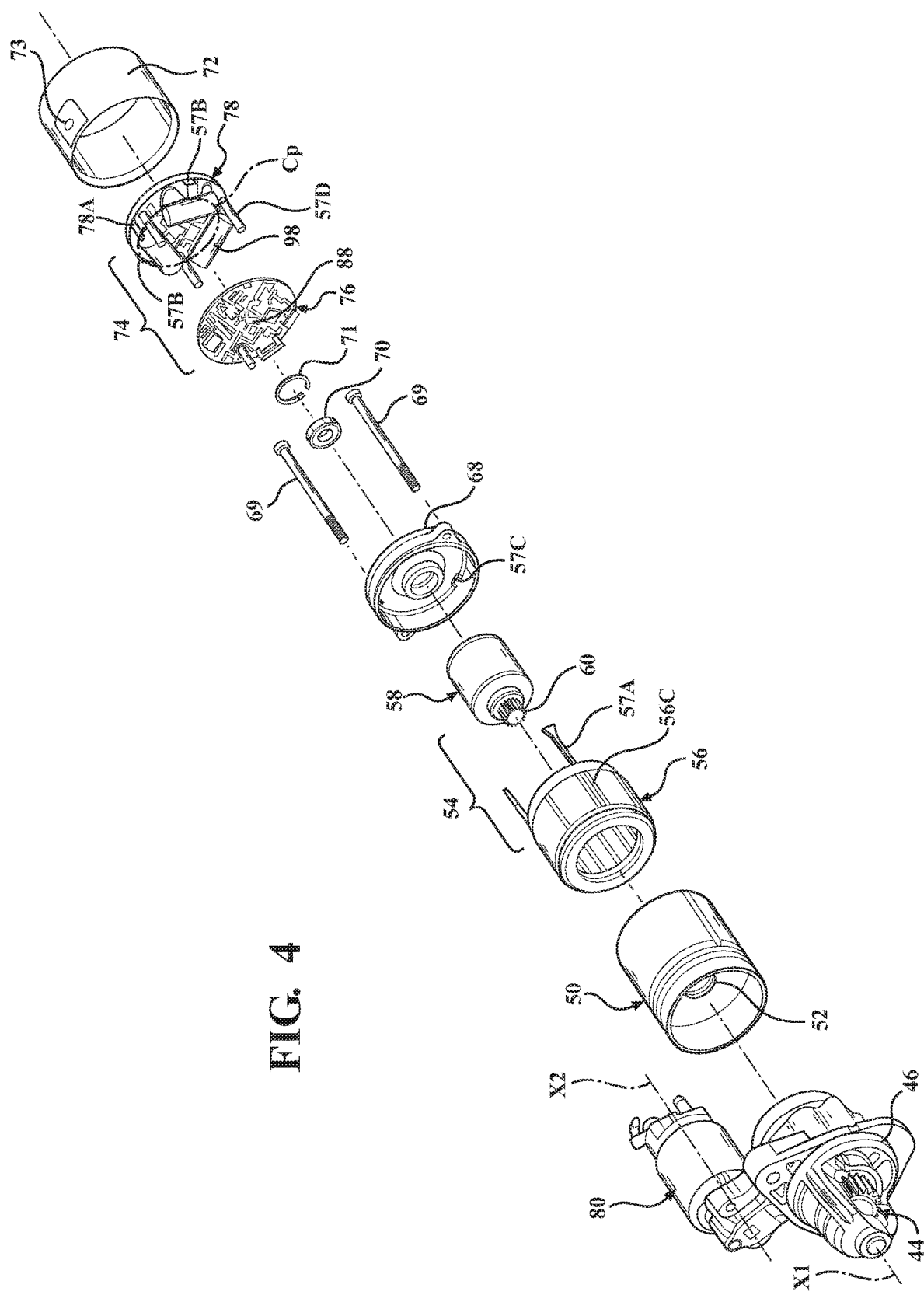
FIG. 4 is an exploded perspective front view of the electric starter shown in FIGS. 2 and 3.

As shown in FIGS. 2-4, the starter assembly 40 is configured as an on-axis electric machine. As defined herein, "on-axis" denotes that the starter assembly 40 is designed and constructed such that the starter's gear-train components, electric motor, and electronic commutator assembly electronics, to be described in detail below, are all arranged essentially on a common first axis X1. The starter assembly 40 includes a partial planetary gear set 42 operatively connected to a starter pinion gear 44, which is configured to slide along the first axis X1. The partial planetary gear set 42 provides a required speed reduction, such as between 25:1 and 55:1, to output an appropriate amount of engine cranking torque. As shown in FIGS. 2-4, the starter assembly 40 includes a gear-set casing 46 configured to house the partial planetary gear set 42 and having a mounting flange 46A for attachment to the engine 12 via appropriate fasteners.

The partial planetary gear set 42 includes an internal ring gear 42-1 fixed to the gear-set casing 46. The partial planetary gear set 42 further includes a plurality of pinion gears 42-2 in mesh with the internal ring gear 42-1, and a planet carrier 42-3 configured to hold the pinion gears. Specifically, the partial planetary gear set 42 may be directly connected to the starter pinion gear 44 via a shaft 48. To such an end, the shaft 48 may include an external spline 48A, while the pinion gear 44 includes a matching internal spline 44A, such that the pinion gear is enabled to slide along the pinion shaft 48 when the pinion gear 44 is pushed out for engagement with the ring gear 12A. As shown, the gear-set casing 46 is configured to support a nose of the shaft 48 via a bearing surface 46B.

The starter assembly 40 also includes a motor casing 50. The gear-set casing 46 may be fixed to the motor casing 50, such as via a suitable fastener (not shown). The motor casing 50 includes a first bearing 52 and is configured to house a brushless electric motor 54. The brushless electric motor 54 may, for example, be any of a number of motor types, such as an induction machine, a surface mount permanent magnet (PM) machine, an interior PM machine, a synchronous reluctance machine, a PM assist synchronous reluctance machine, a drag-cup induction machine, or a switched reluctance machine. The brushless electric motor 54 may also be a radial or an axial flux machine. The wire selection on the brushless electric motor 54 may, for example include a single wire conductor, which may have a round, square, or rectangular cross-section, which may be used for concentrated or distributed winding.

As compared with brushed electric motors, brushless motors generally benefit from increased duration of usable life due to the elimination of physical wear from contact of brushes at the commutator. Further, an electronically commutated electric machine may be capable of more precise control of motor speed as compared to a brushed motor. In some examples, the second electric machine may be operated using a field weakening control strategy to further improve control of the power output and extend motor speed. According to aspects of the present disclosure, the rotation of the starter assembly 40 output is synchronized with the rotation of the ring gear 12A to reduce NVH, which may otherwise occur while the pinion gear 44 is meshing with the ring gear 12A during the an engine 12 restart event.

Referring to FIG. 2 depicting a cross-section of the starter assembly 40, and its exploded view in FIG. 3, the electric motor 54 includes a multi-phase stator assembly 56 having a stator core 56A arranged inside the motor casing 50 concentrically with respect to the first axis X1. As shown in FIG. 3, the stator assembly 56 also includes three equally spaced electrical connectors 57A. A number of windings 56B is provided on the stator core 56A to generate a rotating magnetic field. The electric motor 54 also includes a rotor assembly 58 arranged for rotation inside the stator assembly 56. The rotor assembly 58 includes a rotor 58A. The electric motor 54 is driven when the windings 56B are sequentially powered to create a rotating electromagnetic field, and the rotor assembly 58 is caused to rotate when the stator 56A is thus energized. As shown in FIGS. 3-4, the stator assembly 56 may be fixed to the motor casing 50 via one or more keys 56C to orient the stator leads in a predetermined position with respect to the motor housing 50.

The stator core 56A is generally cylindrical in shape, and defines a hollow central portion to receive the rotor 58A. According to at least one example, outer diameter of the stator core 56A may be limited to no greater than 80 millimeters. The rotor 58A is configured to rotate relative to the stator core 56A about the first axis X1. The rotor 58A may be formed in layers, or laminations, which are stacked in an axial direction along the first axis X1 where the lamination stack defines an active length of the starter assembly 40. According to one example, the lamination stack length is limited to be no greater than 40 millimeters. The overall size of the starter assembly 40 may be dependent on engine 12 packaging constraints, such that a ratio of the outer diameter of the stator core 56A to the lamination stack length is between about 1.5 and 3.5.

The rotor 58A may define a plurality of openings 59 disposed near the outer perimeter portion of the rotor, and each opening may be configured to hold a permanent magnet 59A. The openings 59 are sized to enhance manufacturability, for example having an opening width of at least about 2 millimeters. The plurality of permanent magnets 59A may be formed from a type of iron-based alloy, such as neodymium, and cooperate to generate a magnetic field which interacts with the stator when energized to cause movement of the rotor 58A. For example, each of the permanent magnets 59A may be rectangular in shape to enhance simplicity and reduce manufacturing costs. However, other magnet shapes may be suitable for specific application of the brushless electric motor 54, according to the present disclosure.

The permanent magnets 59A are arranged to create a number of magnetic poles around the rotor 58A. Each of the permanent magnets 59A is affixed within one of the openings 59 of the rotor 58A and functions as a magnetic pole of the rotating electric machine. A magnetic flux is generated in a direction normal to the magnet 59A body. The openings 59 of the rotor 58A may be shaped to include air gaps (not shown) on either side of each permanent magnet 59A. Such air gaps between each pole may be sized to reduce flux leakage between the magnetic poles of the rotor 58A. Each permanent magnet 59A is oriented to have an opposing direction of polarity with respect to adjacent magnets in order to generate magnetic flux in opposite directions. The number of poles may be selected according to performance requirements of the electric motor 54.

The rotor assembly 58 also includes a shaft 58B. The shaft 58B is arranged on the first axis X1, supported by the first bearing 52, and directly connected to a sun gear 60 configured to engage the partial planetary gear set 42. As shown, the sun gear 60 may be integrally formed with the shaft 58B. A nose 62 of the shaft 58B may be piloted via a bearing surface 64 configured to mate with the shaft 48, such that the shaft 48 and the shaft 58B each rotate about the first axis X1. The rotor assembly 58 also includes a rotor position and speed sensor target 66. As shown in FIG. 2, the rotor position sensor target 66 may be configured as one or more diametrically magnetized (shown in FIGS. 2 and 3) or radially magnetized (not shown) magnets affixed to the rotor shaft 58B.

The electric motor 54 also includes a motor end-cap 68 configured to mate with and enclose the motor casing 50. As shown in in FIGS. 3 and 4, the motor end-cap 68 may be fastened to the gear-set casing 46 via a plurality of bolts 69, and thus retain the electric motor 54 and the motor casing 50 therebetween. The motor end-cap 68 includes a second bearing 70 configured to support the shaft 58B for rotation with respect to the first axis X1. As shown in in FIGS. 3 and 4, a snap ring 71 may be employed to retain the second bearing 70 within the motor end-cap 68. The electric motor 54 additionally includes an electronics cover 72 having a power connector aperture 73 (shown in FIGS. 3 and 4) for receiving electrical power from the high-voltage external power source and energy storage system 22.

The electric motor 54 may additionally include a control signal connector (not shown) for communicating with the controller 36 to receive start/stop commands. As shown in FIGS. 3 and 4, the electronics cover 72 is configured to mate with the motor end-cap 68 and house or enclose an electronic commutator assembly 74. The electronic commutator assembly 74 includes a control processor electronics assembly 76 and a power electronics assembly 78. The control processor electronics assembly 76 is arranged between the motor end-cap 68 and the power electronics assembly 78. Accordingly, as shown, the electric motor 54 is arranged or sandwiched between the partial planetary gear set 42 and the electronic commutator assembly 74, while the partial planetary gear set 42 is arranged between the starter pinion gear 44 and the electric motor 54. The electronics cover 72 may be attached to the power electronics assembly 78 via appropriate fasteners, such as screws 79 shown in FIG. 3.

As further shown in FIGS. 3 and 4, the power electronics assembly 78 includes an electrical terminal 78A configured to align with the power connector aperture 73 and receive electrical power from the high-voltage external power source and energy storage system 22 or low voltage battery 34. To facilitate assembly of the electronic commutator assembly 74 with the electric motor 54, the motor end-cap 68 defines three apertures 57C configured to permit the three electrical connectors 57A to pass therethrough for engagement with electrical terminals 57B on the power electronics assembly 78 (shown in FIG. 4). As shown, the power electronics assembly 78 may also include stand-offs or spacers 57D for establishing appropriate relative positioning of the electronic commutator assembly 74 with respect to the electric motor 54 along the first axis X1.

As shown in FIGS. 2-4, the starter assembly 40 additionally includes a solenoid assembly 80. The solenoid assembly 80 includes a pinion-shift solenoid 82 arranged on a second axis X2, which is arranged parallel to the first axis X1. The pinion-shift solenoid 82 is configured to be energized by electrical power from the high-voltage external power source and energy storage system 22, for example, received at a coil terminal 80A. The solenoid assembly 80 is configured to be mounted and fixed to the gear-set casing or housing 46, such as via a snap ring or other suitable fastener(s). The solenoid assembly 80 is further configured to shift or slide the starter pinion gear 44 along the first axis X1, as indicated by arrow 84, for meshed engagement with the ring gear 12A to restart the engine 12 upon a command from the controller 36. The pinion-shift solenoid 82 may shift the starter pinion gear 44, for example, via a one way-clutch 85A, and a lever and bearing arrangement 85B (shown in FIG. 2). However, in a specific embodiment, the starter assembly 40 may be characterized by the absence of such a one-way clutch 85A, as will be described in detail below.

The control processor electronics assembly 76 may include a processor circuit board 86 arranged substantially perpendicular to the first axis X1, and one or more rotor position and speed sensors 88 (shown in FIGS. 2 and 4), such as Hall-effect sensors, configured to cooperate with the rotor position and speed sensor target 66. The position and speed sensor 88 is arranged to maintain a predetermined distance, e.g., 0.5 mm-1.5 mm, from the target magnet 66 at the end of the rotor shaft 58B. The power electronics assembly 78 may include a power circuit board 90 arranged substantially parallel to the processor circuit board 86, an electrical current ripple filter 92, and a heat sink 94 configured to absorb heat energy from the power circuit board 90. The power electronics assembly 78 may additionally include a thermally conductive electrical insulator 96 arranged between the power circuit board 90 and the heat sink 94. The electrical current ripple filter 92 may include a plurality of filter capacitors 98 arranged on a pitch circle Cp (shown in FIG. 4) centered on and substantially perpendicular to the first axis X1. As shown in FIGS. 2-4, each of the plurality of filter capacitors 98 is arranged generally parallel to the power circuit board 90, between the power circuit board and the processor circuit board 86 along the first axis X1.

According to the disclosure, the electronic controller 36 is additionally configured or programmed to detect when the engine 12 stop-start mode is active. Such a mode may be activated automatically by the controller 36 itself, or via a switch 100 (shown in FIG. 1) located in the vehicle 10, which may be actuated by an operator of the vehicle. The controller 36 is configured to monitor a current rotational speed WE and a current rotational or angular position $\theta$ of the engine 12. Each of the current rotational position $\theta$ and the current rotational speed $\omega_E$ of the engine 12 may specifically be detected via appropriate sensors (not shown), and represent respective rotational position and speed of the engine crankshaft 14. The controller 36 is additionally configured to determine whether the current rotational position of the engine 10 is within a predetermined range $R_\theta$ of a threshold or target stop rotational position $\theta_T$. The predetermined range $R_\theta$ may be +/−30 degrees from the target stop rotational position $\theta_T$. The controller 36 is also configured to determine whether the current rotational speed $\omega_E$ of the engine 10 is less than a threshold rotational speed $\omega_T$. The controller 36 is additionally configured to energize the starter assembly 40 to engage the engine 12, such as at the ring gear 12A, when the current rotational position $\theta$ is within the predetermined range $R_\theta$ of the target stop rotational position $\theta_T$ and the current rotational speed $\omega_E$ is less than the threshold rotational speed $\omega_T$. Energizing the starter assembly 40 may include spinning up the pinion gear 44 up to a predetermined speed, such as around 200 RPM, via the brushless electric motor 54.

The controller 36 is also configured to establish a time delay $\Delta t$ following energizing the starter assembly 40 to confirm engagement of the starter assembly with the engine 10. Specifically, the time delay $\Delta t$ may be around 50 milliseconds to confirm engagement of the pinion with the ring gear 12A. The controller 36 is additionally configured to apply a torque T by energizing the starter assembly 40 to stop the engine 12 at the target stop position $\theta_T$. Specifically, the torque T may be generated via the brushless electric motor 54 applying a torque and, while the pinion gear 44 is engaged with the ring gear 12A, rotating the pinion gear counter to the direction of rotation of the engine 12, thereby slowing the engine down at a controlled rate. Such slowing of the engine 12 down at a controlled rate using the generated torque T permits the target stop position $\theta T$ to be achieved more precisely. Furthermore, such a target stop position $\theta_T$ places the engine's first to fire cylinder 12B proximate TDC in preparation to firing, which subsequently enables a reduced NVH restart of the engine 12.

The target stop position $\theta_T$ may be a stop position of the crankshaft 14 with respect to top dead center (TDC) of an engine cylinder 12B particularly identified as the first cylinder to fire at the next engine 12 restart. Specifically, the target stop position $\theta_T$ may be set to within 10 degrees before top dead center (BTDC). The controller 36 may also be configured to assess whether the target stop position $\theta_T$ of the engine 12 has been reached. Furthermore, the controller 36 may be configured to disengage the starter assembly 40 from the engine 12, such as by shifting the pinion gear 44 out of engagement with the ring gear 12A, when the target stop position $\theta_T$ has been reached.

The controller 36 may also be configured to apply the torque T by the starter assembly 40 to stop the engine 12 at the target stop position $P_T$ via determining a difference between the current rotational position $\theta$ and the target stop position $\theta_T$ of the engine. The torque T to stop the engine 12 at the target stop position $\theta_T$ by the starter assembly 40 may be determined according to a mathematical relationship 102 using the determined difference between the current rotational position $\theta$ and the target stop position $\theta_T$. The subject mathematical relationship 102 may be expressed as follows:

$$T = Kp * \theta\text{err} + ki \int \theta\text{err} \, dt$$

In the relationship 102, $\theta_{err}$ is the difference between $\theta_T$ and $\theta$, in other words according to a mathematical relationship "$\theta\text{err} = \theta T - \theta$". Additionally, $K_p$ represents a proportional control gain, and $k_i$ represents an integral control gain. Each of the rotational target stop position $\theta_T$, the threshold rotational speed COT, the time delay $\Delta t$, and the mathematical relationship 102 may be programmed in the controller 36.

As part of controlling operation of the engine 12, the controller 36 typically regulates supply of fuel via specifically configured fuel injectors (not shown) to run the engine. Accordingly, the controller 36 may be additionally configured to detect such fuel being supplied to the engine 10. Additionally, the controller 36 may be configured to regulate the starter assembly 40 to spin the pinion gear 44 up to at a predetermined speed $\omega_p$ prior to energizing the starter assembly to engage the engine 12. To enable the starter assembly 40 to apply the torque T to stop the engine 12, the starter assembly may be characterized by the absence of a one-way clutch 85A arranged between the pinion-shift solenoid 82 and the pinion gear 44. Accordingly, the pinion gear 44 may then be operatively coupled to the brushless electric motor 54 whenever the solenoid 82 is activated, i.e., engaged or energized. The starter assembly 40 may additionally include a spring 104 arranged between the pinion gear 44 and the gear-set housing 46. The spring 104 may be configured to release the pinion gear 44 from the ring gear 12A and return the pinion gear to its resting position when the solenoid 82 is de-energized.

The powertrain 11 may additionally include a sensor 106, such as a crankshaft 14 position sensor. Such a crankshaft position sensor, which may be a Hall Effect sensor, may be used to detect both the current rotational speed $\omega_E$ and the current rotational position $\theta$ of the engine 12. The sensor 106 is configured to detect the engine 12 being positioned and set, i.e., ready, for automatic restart of the engine following the target stop position $\theta_T$ of the engine crankshaft 14 having been reached and generate a signal 108 indicative thereof. The controller 36 is additionally configured to receive the signal 108 from the sensor 106 as indicative of the target stop position $\theta_T$ of the engine crankshaft 14 having been reached, and, therefore, indicative of the engine 12 being positioned and ready, i.e., enabled, for subsequent automatic restart.

Figure 5:
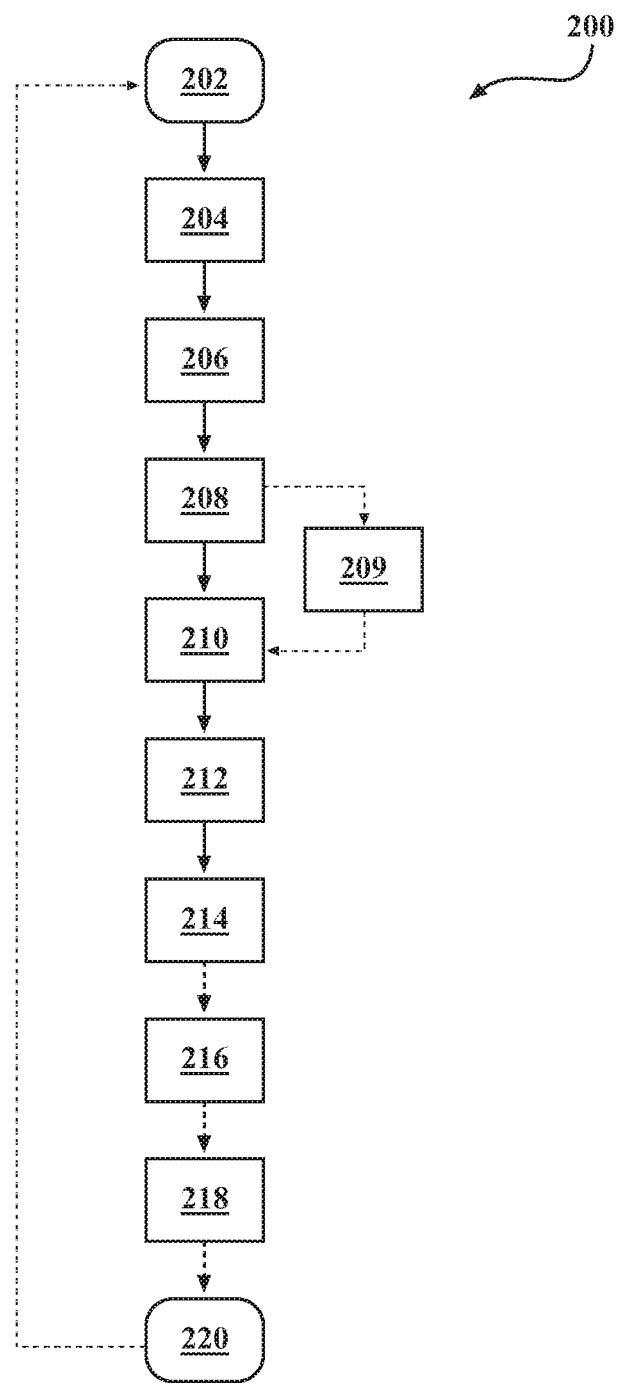
FIG. 5 is a flow diagram of a method for controlled stopping of an internal combustion engine via a brushless electric starter depicted in FIGS. 1-4.

FIG. 5 depicts a method 200 of controlled stopping of the internal combustion engine 12 equipped with a stop-start mode and the starter assembly 40, described above with respect to FIGS. 1-4. The method 200 commences in frame 202 with determining, via the controller 36, when the engine 12 stop-start mode is active. The method 200 then proceeds from frame 202 to frame 204, where the method includes monitoring, via the controller 36, the current rotational speed $\omega_E$ and the current rotational position $\theta$ of the engine 12. Following frame 204, the method 200 advances to frame 206. In frame 206 the method 200 includes determining, via the controller 36, whether the current rotational position $\theta$ of the engine 12 is within the predetermined range $R_\theta$ of the threshold rotational position $\theta_T$, such as in the range of +/−30 degrees with respect to TDC. After frame 206, the method 200 proceeds to frame 208. In frame 208, the method 200 includes determining, via the controller 36, whether the current rotational speed $\omega_E$ of the engine 10 is less than the threshold rotational speed $\omega_T$.

Following frame 208, the method 200 advances to frame 210. In frame 210 the method 200 includes energizing the starter assembly 40 to engage the engine 12, for example at the ring gear 12A, as described above with respect to FIG. 2. Energizing of the starter assembly 40 to engage the engine 12 is accomplished when the current rotational position $\theta$ is within the predetermined range Re of the threshold rotational position $\theta_T$ and the current rotational speed $\omega_E$ is less than the threshold rotational speed $\omega_T$. As described above with respect to FIGS. 1-4, energizing the starter assembly 40 may include spinning up the pinion gear 44 up to a predetermined speed, such as around 200 RPM, via the brushless electric motor 54. The method 200 may also include detecting that fuel is being supplied to the engine 12 and spinning the pinion gear 44 up to the predetermined speed in frame 209 prior to energizing the starter assembly 40 to engage the engine 12 in frame 210.

After frame 210, the method 200 moves on to frame 212, where the method includes establishing, via the controller 36, the time delay $\Delta t$ following energizing the starter assembly 40 to confirm engagement of the starter assembly with the engine 12. As described above with respect to FIGS. 1-4, the time delay $\Delta t$ may be around 50 milliseconds. From frame 212 the method 200 proceeds to frame 214. In frame 214 the method 200 includes applying the torque T by the starter assembly 40 to stop the engine at the target stop position Or. As described above with respect to FIGS. 1-4, the target stop position $\theta_T$ may be set to within 10 degrees BTDC. Additionally, as also described with respect to FIGS. 1-4, applying the torque T may include determining, via the controller 36, a difference between the current rotational position $\theta$ and the target stop position $\theta_T$ of the engine. Furthermore, in such an embodiment, applying the torque T may be enabled by determining the torque T according to the mathematical relationship 102 using the determined difference between the current rotational position $\theta$ and the target stop position Or, as disclosed above.

Following frame 214, the method 200 may advance to frame 216. In frame 216 the method 200 includes assessing, via the controller 36, whether the target stop position $\theta_T$ of the engine 12 has been reached. The method 200 may then proceed from frame 216 to frame 218, where the method includes disengaging the starter assembly 40 from the engine 12 when the target stop position $\theta_T$ has been reached, thus accomplishing the controlled stop of the engine 12. After frame 218, the method 200 may advance to frame 220. In frame 220 the method may include detecting, via the sensor 106, the target stop position Or of the engine crankshaft 14 having been reached. Additionally, in frame 220, the method may include communicating, to the controller 36 via the sensor 106, the signal 108 indicative of the detected target stop position $\theta_T$ of the engine crankshaft 14 having been reached. Accordingly, the method 200 may complete at frame 220, thus enabling an automatic restart of the engine 12. Thereafter, method 200 may return to frame 202.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlled stopping an internal combustion engine equipped with an engine stop-start mode and a starter assembly having a pinion gear, comprising:
   detecting, via an electronic controller, when the engine stop-start mode is active;
   monitoring, via the electronic controller, a current rotational speed and a current rotational position of the internal combustion engine;
   determining, via the electronic controller, that the current rotational position of the internal combustion engine is within a predetermined range of a target stop rotational position;
   determining, via the electronic controller, that the current rotational speed of the internal combustion engine is less than a threshold rotational speed;
   detecting a fuel being supplied to the internal combustion engine and spinning the pinion gear at a predetermined speed prior to energizing the starter assembly;
   energizing the starter assembly to engage the internal combustion engine when the fuel is being supplied and when the current rotational position of the internal combustion engine is within the predetermined range of the target stop rotational position and the current rotational speed of the internal combustion engine is less than the threshold rotational speed;
   establishing, via the electronic controller, a time delay following energizing the starter assembly to confirm engagement of the starter assembly with the internal combustion engine; and
   applying a torque by the starter assembly following the time delay to stop the internal combustion engine at the target stop rotational position.

2. The method of claim 1, further comprising:
   assessing, via the electronic controller, whether the target stop rotational position of the internal combustion engine is reached; and
   disengaging the starter assembly from the internal combustion engine when the target stop rotational position is reached.

3. The method of claim 2, further comprising detecting, via a sensor, the target stop rotational position of the internal combustion engine having been reached, and communicating, to the electronic controller via the sensor, a signal indicative of the target stop rotational position of the internal combustion engine having been reached.

4. The method of claim 1, wherein the starter assembly additionally includes a brushless electric motor and a solenoid, wherein the brushless electric motor is configured to spin the pinion gear and the solenoid is configured to shift the pinion gear, and wherein the time delay is 50 milliseconds.

5. The method of claim 4, wherein the starter assembly is characterized by the absence of a one-way clutch arranged between the solenoid and the pinion gear, such that the pinion gear is operatively coupled to the brushless electric motor when the solenoid is activated.

6. The method of claim 4, wherein the internal combustion engine includes a crankshaft connected to a ring gear, and wherein energizing the starter assembly to engage the internal combustion engine includes energizing the solenoid to shift the pinion gear for engagement with the ring gear.

7. The method of claim 6, wherein the starter assembly additionally includes a housing and a spring arranged between the pinion gear and the housing, and wherein the spring is configured to release the pinion gear from the ring gear when the solenoid is de-energized.

8. The method of claim 7, wherein each of the current rotational position of the internal combustion engine and the current rotational speed of the internal combustion engine is that of the crankshaft.

9. The method of claim 8, wherein the target stop position of the internal combustion engine is a stop position of the crankshaft with respect to top dead center (TDC), and wherein the target stop position of the crankshaft is in a range of +/−30 degrees with respect to TDC.

10. The method of claim 1, wherein applying the torque by the starter assembly to stop the internal combustion engine at the target stop rotational position includes determining, via the electronic controller, a difference between the current rotational position of the internal combustion engine and the target stop rotational position of the internal combustion engine, and determining the torque to stop the internal combustion engine at the target stop rotational position by the starter assembly according to the mathematical relationship $T=K_p*\theta err+k_i \int \theta err \, dt$ using the determined difference between the current rotational position of the internal combustion engine and the target stop rotational position of the internal combustion engine.

11. A vehicle powertrain comprising:
an internal combustion engine equipped with an engine stop-start mode;
a starter assembly having a pinion gear; and
an electronic controller configured to:
detect when the internal combustion engine stop-start mode is active;
monitor a current rotational speed and a current rotational position of the internal combustion engine;
determine that the current rotational position of the internal combustion engine is within a predetermined range of a target stop rotational position;
determine that the current rotational speed of the internal combustion engine is less than a threshold rotational speed;
detect a fuel being supplied to the internal combustion engine and spin the pinion gear at a predetermined speed prior to energizing the starter assembly;
energize the starter assembly to engage the internal combustion engine when the fuel is being supplied and when the current rotational position of the internal combustion engine is within the predetermined range of the target stop rotational position and the current rotational speed is less than the threshold rotational speed;
establish a time delay following energizing the starter assembly to confirm engagement of the starter assembly with the internal combustion engine; and
apply a torque by the starter assembly following the time delay to stop the internal combustion engine at the target stop rotational position.

12. The vehicle powertrain of claim 11, wherein the electronic controller is additionally configured to:
assess whether the target stop rotational position of the internal combustion engine is reached; and
disengage the starter assembly from the internal combustion engine when the target stop rotational position is reached.

13. The vehicle powertrain of claim 12, further comprising a sensor configured to detect the target stop position having been reached, wherein the electronic controller is additionally configured to receive a signal from the sensor indicative of the target stop rotational position having been reached.

14. The vehicle powertrain of claim 11, wherein the starter assembly additionally includes a brushless electric motor and a solenoid, wherein the brushless electric motor is configured to spin the pinion gear and the solenoid is configured to shift the pinion gear, and wherein the time delay is 50 milliseconds.

15. The vehicle powertrain of claim 14, wherein the starter assembly is characterized by the absence of a one-way clutch arranged between the solenoid and the pinion gear, such that the pinion gear is operatively coupled to the brushless electric motor when the solenoid is activated.

16. The vehicle powertrain of claim 14, wherein the internal combustion engine includes a crankshaft connected to a ring gear, and wherein the starter assembly is energized to engage the internal combustion engine via energizing the solenoid to shift the pinion gear for engagement with the ring gear.

17. The vehicle powertrain of claim 16, wherein the starter assembly additionally includes a housing and a spring arranged between the pinion gear and the housing, and wherein the spring is configured to release the pinion gear from the ring gear when the solenoid is de-energized.

18. The vehicle powertrain of claim 17, wherein each of the current rotational position of the internal combustion engine and the current rotational speed of the internal combustion engine is that of the crankshaft.

19. The vehicle powertrain of claim 18, wherein the target stop rotational position of the internal combustion engine is a stop position of the crankshaft with respect to top dead center (TDC), and wherein the stop position of the crankshaft is in a range of +/−30 degrees with respect to TDC.

20. The vehicle powertrain of claim 11, wherein the electronic controller is configured to apply the torque by the starter assembly to stop the internal combustion engine at the target stop rotational position via determining a difference between the current rotational position of the internal combustion engine and the target stop rotational position of the internal combustion engine, and wherein the torque to stop the internal combustion engine at the target stop rotational position by the starter assembly is determined according to the mathematical relationship $T=K_p*\theta err+k_i \int \theta err \, dt$ using the determined difference between the current rotational position and the target stop rotational position of the internal combustion engine.

* * * * *